United States Patent
Miller et al.

(10) Patent No.: US 11,693,974 B2
(45) Date of Patent: *Jul. 4, 2023

(54) TRUST AGENTS

(71) Applicant: Google LLC, Mountain View, CA (US)

(72) Inventors: James Brooks Miller, Sunnyvale, CA (US); Michael Andrew Cleron, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/353,701

(22) Filed: Jun. 21, 2021

(65) Prior Publication Data

US 2021/0312060 A1 Oct. 7, 2021

Related U.S. Application Data

(63) Continuation of application No. 16/659,730, filed on Oct. 22, 2019, now Pat. No. 11,068,603, which is a continuation of application No. 16/375,219, filed on Apr. 4, 2019, now Pat. No. 10,783,255, which is a continuation of application No. 15/798,294, filed on Oct. 30, 2017, now Pat. No. 10,296,747, which is a
(Continued)

(51) Int. Cl.
*G06F 21/31* (2013.01)
*G06F 21/57* (2013.01)

(52) U.S. Cl.
CPC ............ *G06F 21/577* (2013.01); *G06F 21/31* (2013.01); *G06F 2221/034* (2013.01); *G06F 2221/2111* (2013.01)

(58) Field of Classification Search
CPC .. G06F 21/577; G06F 21/31; G06F 2221/034; G06F 2221/2111
See application file for complete search history.

(56) References Cited

U.S. PATENT DOCUMENTS

| 8,387,141 | B1 | 2/2013 | Zhukov et al. |
| 8,402,532 | B2 * | 3/2013 | Downen ................ G06F 21/52 726/17 |
| 8,412,158 | B2 | 4/2013 | Forutanpour et al. |

(Continued)

FOREIGN PATENT DOCUMENTS

| EP | 2375798 A2 | 10/2011 |
| EP | 2662797 A1 | 11/2013 |

(Continued)

OTHER PUBLICATIONS

Riva et al., "Progressive Authentication: Deciding When to Authenticate on Mobile Phones," Security '12 Proceedings of the 21st USENIX Conference on Security Symposium, Aug. 2012.
(Continued)

*Primary Examiner* — Yonas A Bayou
(74) *Attorney, Agent, or Firm* — McDonnell Boehnen Hulbert & Berghoff LLP

(57) ABSTRACT

Systems and techniques are provided for trust agents. Trust agents may be enabled. A state determination may be received from each of the enabled trust agents. The state determination may indicate either a trusted state or an untrusted state. The received state determinations may be combined to determine a security state. A security measure may be enabled or disabled based on the determined security state.

20 Claims, 6 Drawing Sheets

Related U.S. Application Data continuation of application No. 14/311,371, filed on Jun. 23, 2014, now Pat. No. 9,805,201.

(56) References Cited

U.S. PATENT DOCUMENTS

| | | | |
|---|---|---|---|
| 8,713,704 | B2 | 4/2014 | Davis et al. |
| 9,565,168 | B1* | 2/2017 | Marquardt ............... H04L 63/04 |
| 9,578,664 | B1* | 2/2017 | Paczkowski .......... H04L 63/126 |
| 9,633,184 | B2* | 4/2017 | Ben Ari ................ H04W 12/06 |
| 2006/0074986 | A1 | 4/2006 | Mallalieu et al. |
| 2007/0150745 | A1 | 6/2007 | Pierce et al. |
| 2008/0101658 | A1 | 5/2008 | Ahem et al. |
| 2011/0016534 | A1* | 1/2011 | Jakobsson ............ H04L 67/535 726/28 |
| 2012/0007713 | A1 | 1/2012 | Nasiri et al. |
| 2013/0055348 | A1 | 2/2013 | Strauss et al. |
| 2013/0061305 | A1 | 3/2013 | Bruso et al. |
| 2013/0067566 | A1 | 3/2013 | Ohn |
| 2013/0227678 | A1* | 8/2013 | Kang ...................... G10L 17/10 726/19 |
| 2014/0010417 | A1 | 1/2014 | Hwang |
| 2014/0033326 | A1 | 1/2014 | Chien |
| 2014/0096231 | A1* | 4/2014 | Smith ..................... G06F 21/82 726/16 |
| 2014/0109217 | A1* | 4/2014 | Park ................... G06F 3/04883 726/17 |
| 2014/0137233 | A1* | 5/2014 | Salter ................... G06F 3/0213 726/17 |
| 2014/0189850 | A1* | 7/2014 | Marshall ............... G06F 21/316 726/17 |
| 2014/0289820 | A1* | 9/2014 | Lindemann ............. G06F 21/32 726/5 |
| 2014/0289833 | A1 | 9/2014 | Briceno et al. |
| 2014/0325639 | A1* | 10/2014 | Hori ...................... H04W 12/12 726/17 |
| 2014/0380424 | A1 | 12/2014 | Thompson |
| 2014/0380462 | A1* | 12/2014 | Hosoda ................. G06F 21/31 726/17 |
| 2015/0371034 | A1 | 12/2015 | Miller et al. |

FOREIGN PATENT DOCUMENTS

| | | |
|---|---|---|
| WO | 2009/026337 A1 | 2/2009 |
| WO | 2011/057287 A1 | 5/2011 |
| WO | 2013/131265 A1 | 9/2013 |

OTHER PUBLICATIONS

Shi et al., "Implicit Authentication through Learning User Behavior," ISC '10 Proceedings of the 13th International Conference on Information Security, Oct. 2010.

* cited by examiner

TRUST AGENTS

CROSS REFERENCE TO RELATED APPLICATIONS

The present application claims the benefit of priority under 35 U.S.C. § 120 as a continuation of U.S. patent application Ser. No. 16/659,730 entitled "TRUST AGENTS," filed on Oct. 22, 2019, which is a continuation of U.S. patent application Ser. No. 16/375,219 entitled "TRUST AGENTS," filed on Apr. 4, 2019, which is a continuation of U.S. patent application Ser. No. 15/798,294 entitled "TRUST AGENTS," filed on Oct. 30, 2017, which is a continuation of U.S. patent application Ser. No. 14/311,371 entitled "TRUST AGENTS," filed on Jun. 23, 2014, the disclosures of each of which are hereby incorporated by reference in its entirety for all purposes.

BACKGROUND

Mobile computing devices, such as smartphones and tablets, may require users to authenticate themselves to the device before allowing the user to perform various actions. For example, a smartphone lock screen may require the user to enter a PIN to unlock the smartphone, and may also require the user to enter passwords at various other points during usage of the smartphone. This may result in frequent interruption of the user's use of the mobile computing device, as the user has to stop whatever action they were attempting in order to authenticate themselves to the device. The user may also set security preferences so that the mobile computing device doesn't present certain prompts for authorization. For example, a smartphone's user may set preferences that prevent the smartphone from requesting a PIN to unlock the smartphone. This may streamline the user's experience, as the user may see fewer interruptions, but may make the mobile computing device less secure, as any other user could unlock and use the smartphone.

There may be many alternative ways for a user to change the settings of their mobile computing device to prevent requests for the user to authenticate themselves. Password and PIN entry, active and passive biometric identification, and location based security may all be used. Because each form of authentication may be separate, it may be difficult for the user to manage which forms of authentication are in use at a given time. The user may also have difficulty determining when a particular form of authentication has been used to determine that the user does not need to provide further authentication to perform an action such as unlocking the device.

BRIEF SUMMARY

According to an embodiment of the disclosed subject matter, one or more trust agents may be enabled. A state determination may be received from each of the one or more enabled trust agents, where the state determination may indicate either a trusted state or an untrusted state. The received state determinations may be combined to determine a security state. A security measure may be enabled or disabled based on the determined security state.

The security state may be a trusted state or untrusted state. Enabling or disabling the security measure may include enabling the security measure when the determined security state is a trusted state and disabling the security measure when the determined state is an untrusted state. The security measure may be a lock screen requiring a credential to unlock and an application requiring a credential to operate. The enabled trust agents may be disabled, and no state determination may be received from the disabled trust agents. Each trust agent may receive signals from a sensor. Each trust agent may not communicate a state determination directly to any of the other one or more trust agents.

The operation of one of the trust agents may be modified to change when the state determination from the trust agents indicates a trusted state. Accompanying a state determination indicating a trusted state from an enabled trust agent, a time component may be received, where the time component may indicate an expiration of the state determination. Accompanying a state determination from an enabled trust agent, an indication of a sensor or signal that was the basis for the state determination may be received. A representation of the security state and an indication of the sensor or signal that was the basis for a state determination that was combined to determine the security state may be displayed.

Combing the received state determinations may include ORing, ANDing or AND NOTing the state determinations with respect to indications of trusted state such that the security state is a trusted state when at least one of the received state determinations indicates a trusted state. The security state may be determined to be an untrusted state when state determination indicating a trusted state expires due to a time component and no other unexpired state determinations indicating a trusted state exist at the time the state determination expires.

According to an embodiment of the disclosed subject matter, a means for enabling one or more trust agents, a means for receiving a state determination from each of the one or more enabled trust agents, where the state determination may indicate either a trusted state or an untrusted state, a means for combining the received state determinations to determine a security state, a means for enabling or disabling a security measure based on the determined security state, a means for enabling the security measure when the determined security state is a trusted state and disabling the security measure when the determined state is an untrusted state, a means for disabling one of the one or more enabled trust agents, and where a state determination may not be received from the one or more disabled trust agents, a means for modifying the operation of one of the one or more trust agents to change when the state determination from the one or more trust agents indicates a trusted state, a means for receiving, accompanying a state determination indicating a trusted state from at least one of the enabled trust agents, a time component, where the time component may indicate an expiration of the state determination, a means for receiving, accompanying a state determination from at least one of the enabled trust agents, an indication of a sensor or signal that was the basis for the state determination, a means for displaying a representation of the security state and an indication of the sensor or signal that was the basis for one of the state determinations that was combined to determine the security state, a means for ORing, ANDing or AND NOTing the state determinations with respect to indications of trusted state such that the security state is a trusted state when at least one of the received state determinations indicates a trusted state, and a means for determining that the security state is an untrusted state when state determination indicating a trusted state expires due to a time component and no other unexpired state determinations indicating a trusted state exist at the time the state determination expires, are included.

Systems and techniques disclosed herein may allow for trust agents. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
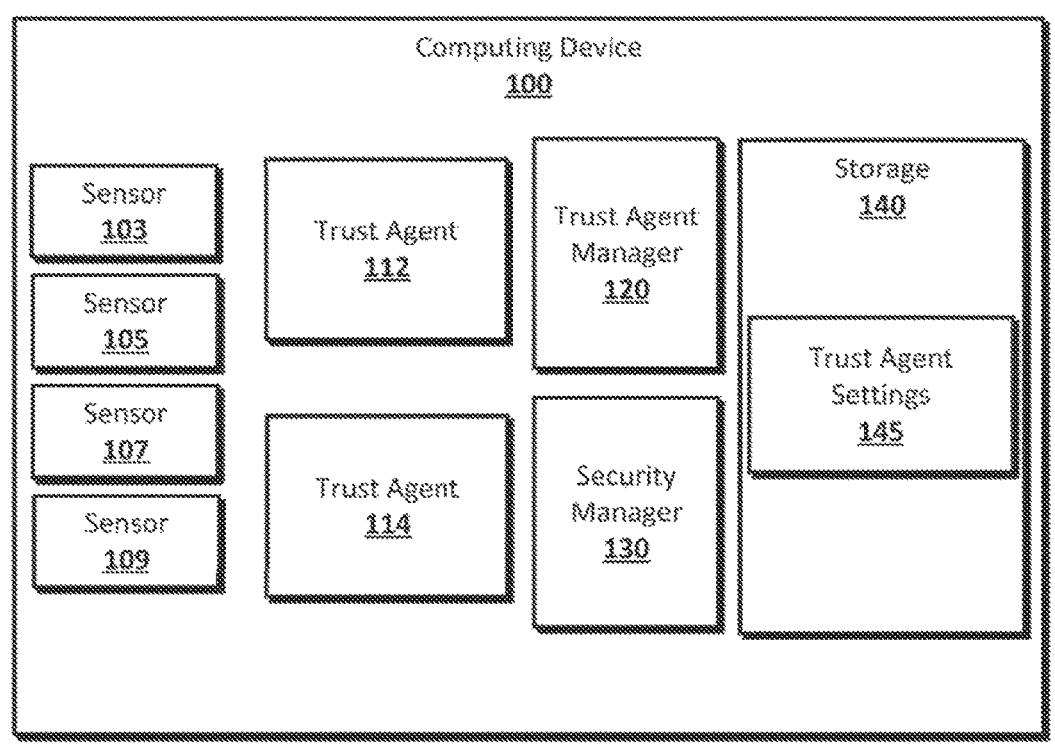
FIG. 1 shows an example system suitable for trust agents according to an implementation of the disclosed subject matter.

Trust agents may allow a computing device, such as a smartphone or tablet, to determine whether or not the computing device is in a trusted state, while giving a user of the computing device the ability to manage how this determination is made. A computing device may include a number of security measures, such as, for example, locking the screen of a smartphone after some period of inactivity. The user may then be required to enter a password, PIN, pattern, biometric credential, or other form of credential to unlock and resume use of the computing device. To make use of the computing device simpler, the computing device may be able to determine whether the device is in a trusted state, allowing the computing device to skip certain security measures, for example, not requiring the user to provide credentials to unlock the computing device after the computing device has locked. This determination may be made using trust agents. The trust agents on a computing device may receive signals from various sensors of the computing device, including hardware sensors, such as for example, Bluetooth, WiFi, GPS and cellular radios, accelerometers, pressure sensors, moisture sensors, touchscreens, fingerprint scanners, cameras, and microphones, and software sensors, such as password, PIN, and pattern detectors, and other detectors that may analyze user input. A computing device may include multiple trust agents, and each trust agent may receive signals from any combination of available sensors. Each trust agent may independently determine whether the computing device is in a trusted state or an untrusted state, and send the determination to a trust agent manager. The trust agent manager may use the trusted/untrusted state determinations from the various trust agents on the computing device to determine whether the computing device should be in a trusted state. Feedback may be provided to the user of the computing device, for example, through icons displayed on the screen, indicating whether or not the computing device is in a trusted state, and the trust agent or agents, and sensors or signals, responsible for putting the computing device in a trusted state. The user of the computing device may be able to manage the trust agents, for example, enabling and disabling individual trust agents, and changing the circumstances under which a trust agent will determine that the computing device should or should not be in a trusted state. The trust agents may also be managed by, for example, a device policy administration application installed on the computing device, which may implement policies, for example, corporate policies, governing the enabling, disabling, and functioning of trust agents on the computing device. A device policy administration application may enforce a policy that differs from a preference for a trust agent set by a user, and may affect trusted state determinations and security measures for all accounts on a computing device or only corporate accounts.

Trust agents, implemented using any suitable combination of hardware and software, may be installed on a computing device, such as, for example, a smartphone or tablet. A trust agent may receive signals from a set of sensors on the computing device and use those signals to make a trusted/untrusted state determination in any suitable manner. For example, a first trust agent may receive signals from the computing device's Bluetooth radio, indicating whether the computing device is connected to another device using Bluetooth, and from the computing device's GPS, WiFi, and cellular radios, indicating the current location of the computing device. The first trust agent may combine these signals, for example, using rules, machine learning systems, heuristics, historical data about the computing device, or in any other suitable manner, to determine whether the received signals correspond to the computing device being in a situation where less security is required, allowing the computing device to be put into a trusted state. A second trust agent may receive signals from all of the available sensors on the computing device and use a machine learning system to detect and match patterns in usage of the computing device to make the trusted/untrusted state determination. All of the trust agents on a computing device may make trusted/untrusted state determinations independently. For example, a first trust agent may use only signals from the Bluetooth radio, while a second trust agent may use signals from the Bluetooth radio combined with GPS, WiFi, and cellular signals for location. The first and second trust agent may both receive signals directly from the Bluetooth radio and attendant software, and the second trust agent may not rely on any trusted/untrusted state determination made by the first trust agent based on the Bluetooth signals. This may prevent any trust agent's determination from being influenced by another trust agent. Trust agents may share raw signal data received from sensors, or other raw state information with each other, but may not share trusted/untrusted state determinations or other data resulting from a trust agent processing raw signals data. Other signals used by a trust agent may include any cues regarding the proximity of other hardware to the computing device, including Bluetooth devices, WiFi access points, computers, smartphones, and tablets, the time of day, day of week, day of month, and day of year, and the detection through facial and voice recognition of nearby people who are trusted, such as family and co-workers of the authorized user of the computing device.

The trust agents on a computing device may be managed, for example, using a trust agent manager. The trust agent manager may be a component of the operating system used as part of the operating platform for the computing device, or may be installed separately and interface with the security elements of the operating system. The trusted/untrusted state determinations from the trust agents on a computing device may be analyzed and combined, for example, by the trust agent manager, in any suitable manner to make a determination as to whether the computing device should be placed into or taken out of a trusted state. For example, the trusted/untrusted state determinations may be ORed together, with respect to the trusted state, such that if any individual trust agent determines the computing device should be in a trusted state, the computing device will be placed in a trusted state regardless of the determinations from the other trust agents. In this case, the computing device will only be in an untrusted state when none of the trust agents determine that the computing device should be in a trusted state. Any number of state determinations may be combined using any combination of Boolean operators (such as AND, NOT, OR, and AND NOT). For example, state determinations or other conditions A, B and C may be combined such that the state of a device is determined to be trusted only when the statement A AND (B OR C) is true, or when the statement A AND B AND NOT C is true, or any other combination of any number of state determinations. The state determination may be communicated, for example, by the trust agent manager, to the security elements, for example, a security manager, of the operating system of the computing device. The security manager may use the trusted/untrusted state determination to govern the behavior of the computing device, for example, by not requiring the user authenticate themselves to unlock the computing device or preventing the computing device from entering a locked state whenever the computing device has been determined to be in a trusted state.

Whether the computing device is in a trusted or untrusted state, and which trust agent or trust agents were responsible for that state, may be presented to the user of the computing device. For example, icons may be displayed in a notification area of the screen of the computing device. For example, a lock icon may be depicted as locked to represent the computing device being in an untrusted state, and unlocked to represent the computing device in a trusted state. An icon representing a trust agent responsible for putting the computing device in a trusted state, or the sensors from which the responsible trust agent received signals, may also be displayed, so that the user may be aware of both the state of the computing device and the reason the computing device is in that state. The user may be able to access settings for the trust agent, for example, to enable, disable, or modify the trust agent, using the displayed icon or other visual representation.

Each trust agent on the computing device may be enabled and disabled individually. For example, a user may be able to manage which trust agents are active and which trust agents are not, based on user preference. A trust agent that has been disabled may not function, as it may not receive signals or make trusted state/untrusted state determinations. The determinations made by trust agents may also be adjusted by the user. For example, a trust agent may make trusted/untrusted state determinations based the computing device's location as determined through signals from a GPS radio and addresses entered by the user for places as such home and work. The trust agent may default to determining that the computing device should be in a trusted state whenever the trust agent determines that the computing device is located at a work address input by the user. The user may change this determination, so that the trust agent determines the computing device should be in an untrusted state when the computing device is at the work address, as the user may wish to keep security measures in place while at work. Trust agents may also be installed, updated, and uninstalled from the computing device, for example, allowing for the removal of unneeded trust agents, updating of old trust agents, and the addition of new trust agents to the computing device, for example, as desired by the user.

The changes made to security measures on a computing device in a trusted state may also be managed by the user. For example, the user may set the computing device to never lock the screen or timeout when in a trusted state, or may change the delay on locking the screen or timing out. The user may specify that no authentication request needs to be made to the user when the device is in a trusted state and the user attempts certain actions such as, for example, making a purchase from an application ecosystem's storefront, but should still be made when the user attempts other actions, such as accessing a banking application.

The trusted/untrusted state determination made by a trust agent may include a time component, which may cause the determination to expire after a certain time period. For example, a trust agent may determine that the computing device should be in a trusted state, but the determination may have a time component of 5 minutes. Five minutes after entering a trusted state based on the determination from the trust agent, the computing device may re-enter an untrusted state unless another determination has been made, by the same or different trust agent, indicating that the computing device should remain in the trusted state. A trust agent may also revoke a determination that the computing device should enter an untrusted state. For example, a trust agent may determine that the computing device should enter a trusted state, with a time component of 5 minutes. Two minutes later, the trust agent may determine, based on newly received signals, the computing device should exit the trusted state. The trust agent may revoke the trusted state determination, which may cause the computing device to enter an untrusted state if no other trust agents have determined that the computing device should be in a trusted state. The time component may also be set by, for example, the user or by a policy on the computing device. This may limit the amount of time any trust agent's trusted state determination may last, regardless of the manner in which the trust agent made the trusted state determination. For example, the user may set a time component maximum of 3 minutes for all trusted state determinations made by a particular trust agent, so that trust agent's trusted state determinations may always expire in at most 3 minutes.

Trust agents may also be used to change security measures for multiple accounts on the same computing device. For example, a user may have two accounts on a computing device, a work account and personal account. A trust agent may receive signals that indicate the entry of the correct password for the work account and determine that the computing device should enter a trusted state, and this may result in the relaxing of security measures for the personal account. For example, the user may check email for the personal account without having to provide a password as a result of the trusted state entered into based on the user successfully logging in to the work account. This may not work in reverse, for example, entering the password to access the personal account may put the computing device in a trusted state regarding the personal account, but may not relax security measures related to the work account.

FIG. 1 shows an example system suitable for trust agents according to an implementation of the disclosed subject matter. A computing device 100 may include sensors, such as the sensors 103, 105, 107 and 109, trust agents, such as the trust agents 112 and 114, trust agent manager 120, security manager 130, and storage 140. The computing device 100 may be any suitable device, such as, for example, a computer 20 as described in FIG. 6, for implementing the trust agents 112 and 114, trust agent manager 120, and security manager 130 storage 140. The computing device 100 may be a single computing device, or may include multiple connected computing devices, and may be, for example, a mobile computing device, such as a tablet, smartphone, or laptop, or other computing device, such as a desktop, smart television, or media streaming device. The trust agents 112 and 114 may be used to analyze signals from the sensors 103, 105, 107, and 109 and send trusted/untrusted state determinations to the trust agent manager 120. The trust agent manager may manage the trust agents 112 and 114 based on the trust agent settings 145 from the storage 140. The security manager 130 may manage the security state of the computing device 100 based on security state determinations from the trust agent manager 120. The trust agent settings 145 may be stored in the storage 140 in any suitable manner.

The sensors 103, 105, 107, and 109 may be any suitable hardware and software sensors for generating signals regarding the state of the computing device 100. The sensors 103, 105, 107, and 109 may be, for example, hardware sensors, such as a GPS chip, a WiFi radio, a cellular radio, a camera, a microphone, a touchscreen, an accelerometer, a pressure sensor, a moisture sensor, and a fingerprint scanner. The sensors 103, 105, 107, and 109, may also be, for example, software sensors, such as a system clock, an input detector, or any component of the computing device 100, such as the operating system, capable of receiving external data relevant to the current state of the computing device 100, such as the entry of passwords or PINs associated with accounts used with the computing device 100. The sensors 103, 105, 107, and 109 may generate signals that may be used by the trust agents 112 and 114.

The trust agents 112 and 114 may be any suitable combination of hardware and software implemented on the computing device 100 for analyzing signals from the sensors 103, 105, 107 and 109 and determining whether the computing device 100 should be in a trusted or untrusted state. For example, the trust agents 112 and 114 may be applications or other such components installed on the computing device 100 independently from the operating system used by the computing device 100, or may be components of the operating system. A user may, for example, download and install the trust agents 112 and 114 from a storefront for an application ecosystem associated with the same platform as the operating system on the computing device 100. The trust agents 112 and 114 may be capable of receiving signals from any of the sensors 103, 105, 107, and 109 on the computing device 100. The signals may be, for example, raw signal data, such as raw audio data from a microphone, or may be processed by software by software or hardware associated with the signals, for example, encoding software associated with a camera.

The trust agent manager 120 may be any suitable combination of hardware and software on the computing device 100 for managing trust agents, such as the trust agents 112 and 114, and making determination about the security state of the computing device 100 based on determinations received from the trust agents 112 and 114. For example, the trust agent manager 120 may be a component of the operating system used by the computing device 100, or may a separately installed application which may use an API to interface with the operating system to manage the security state of the computing device 100. The trust agent manager 120 may include an interface that allows a user to manager the trust agents 112 and 114, for example, enabling and disabling the trust agents 112 and 114 individually, and changing settings used by the trust agents 112 and 114 when determining whether the computing device 100 should be in a trusted state. The trust agent manager 120 may store settings for the trust agents 112 and 114 in the trust agent settings 145.

The trust agent manager 120 may determine the security state of the computing device 100 based on the trusted/untrusted state determinations made by the trust agents 112 and 114. For example, the trust agent manager 120 may OR, AND NOT and/or AND together the determinations with respect to a trusted state, such that the trust agent manager 120 may cause the computing device 100 to enter a trusted state when either one of the trust agents 112 and 114 has determined that the computing device should be in a trusted state. The trust agent manager 120 may also be responsive to a time component in determinations received from the trust agents 112 and 114. For example, if the trust agent 112 determines that the computing device 100 should be in a trusted state with a time component of 5 minutes, the trust agent manager 120 may cause computing device 100 to enter a trusted state. After 5 minutes have elapsed, the trust agent manager 120 may cause the computing device 100 to leave the trusted state in the absence of a more recent determination by the trust agent 112 or 114 that the computing device 100 should be in a trusted state.

The trust agent manager 120 may also display the security state of the computing device 100 and the reason for the security state to the user of the computing device 100. For example, the trust agent manager 120 may use any combination of icons and text shown on a display of the computing device 100 to represent to the user whether the computing device 100 is in a trusted or untrusted state and the trust agent 112 or 114 responsible for the trusted/untrusted state determination, along with any of the specific sensors 103, 105, 107, and 109 whose signals were used by the trust agents 112 and 114. The user may be able to access the interface for enabling and disabling the trust agents 112 and 114 using the displayed representation of the security state of the computing device 100.

The security manager 130 may be any suitable combination of hardware and software on the computing device 100 for governing the operation of the computing device 100 based on the current security state of the computing device 100. For example, the security manager 130 may be a part of the operating system or platform used by the computing device 100. The security manager 130 may use the security state, either trusted or untrusted, as determined by the trust agent manager 120 to affect the operations of various hardware and software components of the computing device 100. For example, the computing device 100 may be a smartphone in a sleep state, with the display off. A hardware button on the smartphone may wake the smartphone and turn the display on. When the hardware button is pressed, the security manager 130 may govern whether the smartphone will be in a locked state after waking up and require the user to authenticate themselves to resume using the smartphone, or whether the smartphone will awaken into an unlocked state. If the trust agent manager 120 has determined that the smartphone is in a trusted state, the security manager 130 may cause the smartphone to awaken into an unlocked state. The security manager 130 may disable and re-enable security measures on the computing device 100 based on the security state of the computing device 100.

Figure 2:
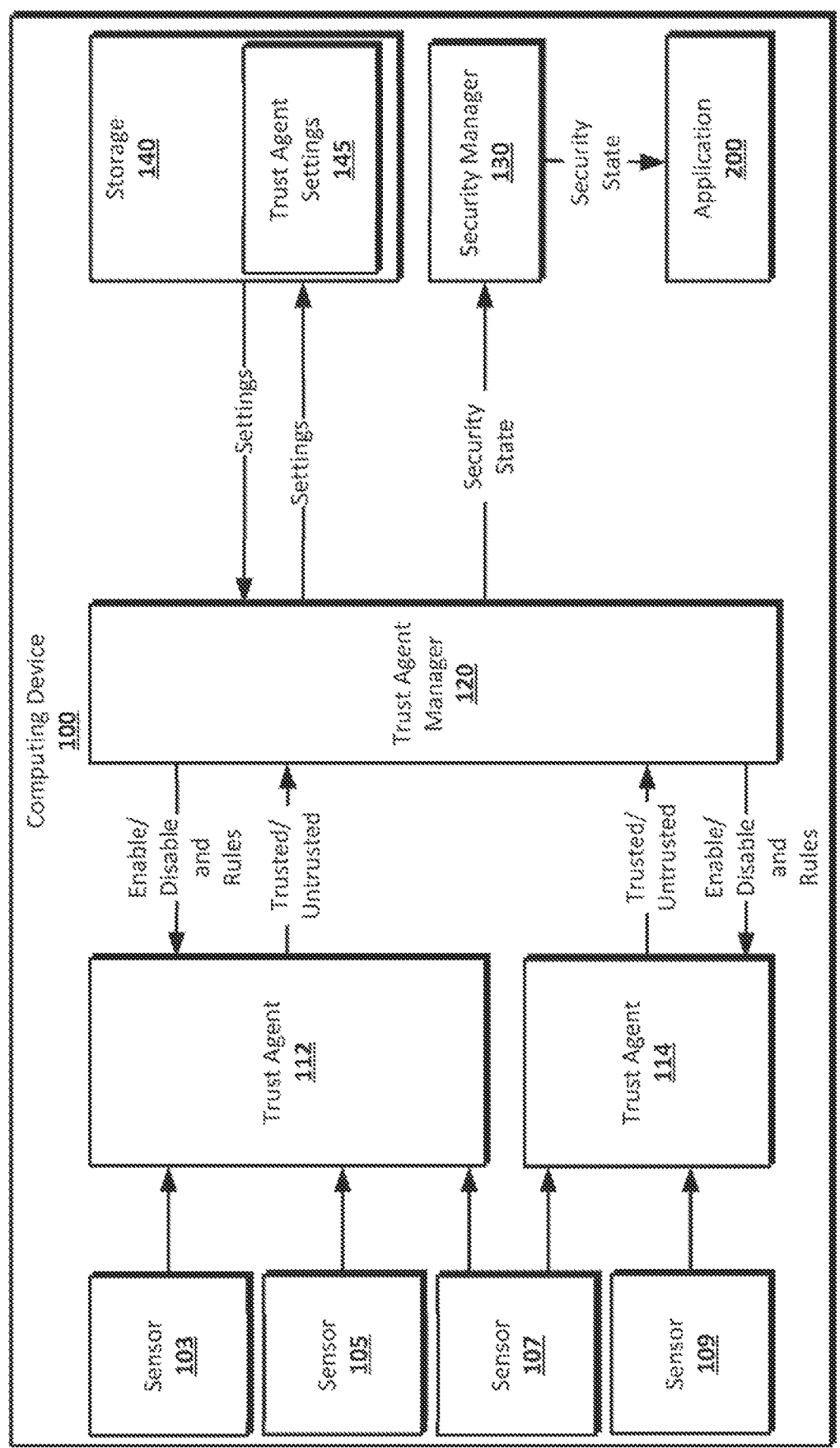
FIG. 2 shows an example arrangement for trust agents according to an implementation of the disclosed subject matter.

FIG. 2 shows an example arrangement for trust agents according to an implementation of the disclosed subject matter. The trust agent manager 120 may be used, for example, by a user of the computing device 100, to edit the settings for the trust agent settings 112 and 114 in the trust agent settings 145. For example, the user may select to enable or disable either or both of the trust agent 112 and the trust agent 114. The trust agent manager 120 may receive the trust agent settings 145 from the storage 140 and use them to manage the trust agents 112 and 114, for example, enabling or disabling them as specified by the trust agent settings 145.

When enabled, the trust agents 112 and 114 may receive signals from any combination of the sensors 103, 105, 107, and 109. For example, the trust agent 112 may receive signals from the sensors 103, 105, and 107, and the trust agent 114 may receive signals from the sensors 107 and 109. The trust agent 112 and the trust agent 114 may receive the signal from the sensor 108 independently, or may share the signal from the sensor 108, for example, with the trust agent 112 sharing the raw signal from the sensor 108 with the trust agent 114. For example, the sensor 107 may be a microphone. Both the trust agent 112 and the trust agent 114 may use voice analysis to analyze the audio signal from the microphone for the voice print of an authorized user of the computing device 100. For example, the analysis may consist of deriving voice signal characteristics from the received voice signal and comparing them to stored characteristics that are associated with the identity and/or permissions in a database. The identity may be the identity of an individual, organization and/or type of individual and/or organization. The permissions may specify whether access is to be granted to one or more specific resources or types of resources. The permissions may also specify conditions that must be true for access to be granted. In this way, a user may be authenticated and/or authorization to access a resource may be determined. The trust agent 112 and the trust agent 114 may analyze the audio signal separately, and may not rely on the analysis done by the other trust agent. This may allow the trust agents 112 and 114 to verify the presence of an authorized user, and make trusted/untrusted state decisions, independently.

The trust agents 112 and 114 may analyze the signals received from the sensors 103, 105, 107, and 109 to determine whether the computing device 100 should be in a trusted or untrusted state. The trust agents 112 and 114 may also operate based on rules set for the trust agents 112 and 114 in the trust agent settings 145. For example, the sensor 103 may be a camera, the sensor 105 may be a password input detector, the sensor 107 may be microphone, and the sensor 109 may be a Bluetooth radio. The analysis of each of these signals may be accomplished as discussed above for a voice signal. The trust agent 112 may analyze the video signal received from the sensor 103, for example, to perform facial recognition, the sensor 105, for example, to determine if an account associated with an authorized user of the computing device 100 has been successfully logged-in to with a password recently, and the audio signal from the sensor 107, for example, to perform voice recognition. The trust agent 112 may perform the analysis in any suitable manner to determine whether the computing device 100 should be in a trusted or untrusted state, and to determine the time component for a trusted state determination. The trust agent 114 may analyze, in any suitable manner, the audio signal from the sensor 107, and any connected or in-range Bluetooth devices reported by the sensor 109, to determine whether the computing device 100 should be in a trusted or untrusted state, and to determine the time component for a trusted state determination.

The trust agent manager 120 may receive the trusted/untrusted state determinations made by the trust agents 112 and 114. The trust agents 112 and 114 may operate continuously, and may send trusted/untrusted state determinations to the trust agent manager 120 on a continual basis, or, for example, on a discrete basis whenever a determination is made. For example, the trust agent 112 may send a trusted state determination to the trust agent manager 120, and 2 minutes later send an untrusted state determination to the trust agent manager 120, revoking the trusted state determination due to some change in the signals received from the sensors 103, 105, and 107. The trust agent manager 120 may also receive any time component attached to a trusted state determination from the trust agents 112 and 114, and indications from the trust agents 112 and 114 as to the basis for the trusted/untrusted state determinations. For example, the trust agent 112 may determine that the computing device 100 should be in a trusted state, and may indicate to the trust agent manager 120 that the determination is based on the detection of the face of an authorized user of the computing device 100 by the sensor 103.

The trust agent manager 120 may combine the trusted/untrusted state decisions received from the trust agents 112 and 114 in any suitable manner to determine the security state of the computing device 100. For example, the trust agent manager 120 may OR together the trusted/untrusted state decisions with respect to the trusted state, so that if either one of the trust agents 112 and 114 determines that the computing device 100 should be in a trusted state, the trust agent manager 120 will cause the computing device 100 to enter the trusted state. The trust agent manager 120 may cause the computing device 100 to exit the trusted state when, for example, all trusted state determinations have been revoked. For example, if both the trust agent 112 and 114 determine that the computing device 100 should be in a trusted state, the trust agent manager 120 may not exit the trusted state until both the trust agent 112 and the trust agent 114 revoke their trusted state determinations and replace them with untrusted state determinations. The trust agent manager 120 may also exit the trusted state when the trusted state determinations have expired, as determined by their time components, or when the user changes settings in the trust agent settings 145 that cause all trusted state determinations to be revoked. For example, the trust agent 112 may determine that the computing device 100 should be in a trusted state due to facial recognition of an authorized user of the computing device 100. The trust agent manager 100 may then cause the computing device 100 to enter the trusted state. The authorized user may change the trust agent settings 145, selecting to disallow the trust agent 112 from making a trusted state determination based on facial recognition. The trust agent 112 may revoke the trusted state determination based on the new setting, and the trust agent manager 120 may cause the computing device 100 to exit the trusted state absent a trusted state determination from the trust agent 114.

The security manager 130 may receive the security state determination from the trust agent manager 120. The security manager 130 may cause implementation of the effects of the security state on the computing device 100. For example, an application 200 may request instructions on whether to request credentials from the user of the computing device 100. When the trust agent manager 120 has placed the computing device 100 in a trusted state, the security manager 120 may indicate the credentials do not need to be requested from the user. The application 200 may be, for example, a component of the operating system of the computing device 100 responsible for requesting a password on a lock-screen after the computing device 100 is awakened from sleep. The security manager 130 may cause the application 200 to not display the lock-screen, and not request a password, when the computing device 100 is awakened if the computing device 100 is in a trusted state. The security manager 130 may also prevent the application 200 from locking the computing device 100 while the computing device 100 is in a trusted state.

The security manager 130 may prevent other types of application from requesting credentials. For example, the application 200 may be the storefront for an application ecosystem. The user may not be required to enter credentials to make a purchase using saved payment information if the computing device 100 is in a trusted state. The security manager 130 may also be subject to trust agent settings 145. For example, the trust agent settings 145 may indicate that even when the computing device 100 is in a trusted state, a banking application may always require the user to enter credentials.

Figure 3:
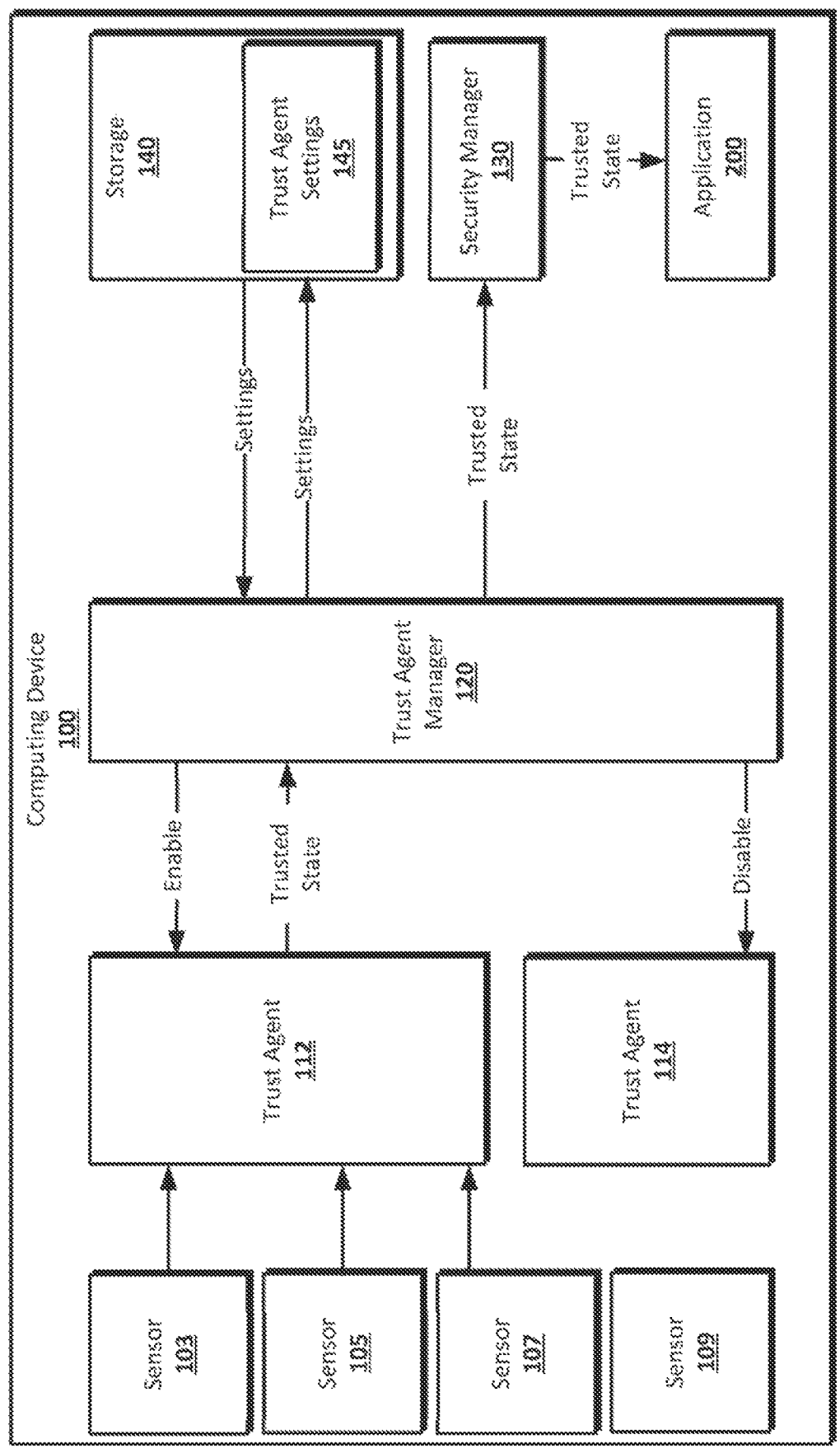
FIG. 3 shows an example arrangement for trust agents according to an implementation of the disclosed subject matter.

FIG. 3 shows an example arrangement for trust agents according to an implementation of the disclosed subject matter. The user may use the trust agent manager 120 to edit the trust agent settings 145, disabling the trust agent 114. The trust agent manager 120 may disable the trust agent 114 based on the trust agent settings 145, causing the trust agent 114 to cease operating on the computing device 100. The trust agent 114 may no longer receive signals from the sensors 107 and 109, and may not make any trusted/untrusted state determinations while disabled.

The trust agent 112 may be enabled, and may operate on the computing device 100. The trust agent 112 may receive signals from the sensors 103, 105, and 107, and determine that the computing device 100 should be in a trusted state. The trusted state determination, along with any time component and indication of the basis for the determination, may be sent to the trust agent manager 120. The trust agent manager 120 may cause the computing device 100 to enter a trusted state based on the trusted state determination from the trust agent 112. The trusted state determination may be sent to the security manager 130, which may govern the operation of the application 200 based on the trusted state determination. For example, the application 200 may need to determine whether to request a password from a user of the computing device 100. The security manager 130 may cause the application 200 to not request the password based on the computing device 100 being in a trusted state.

Figure 4A:
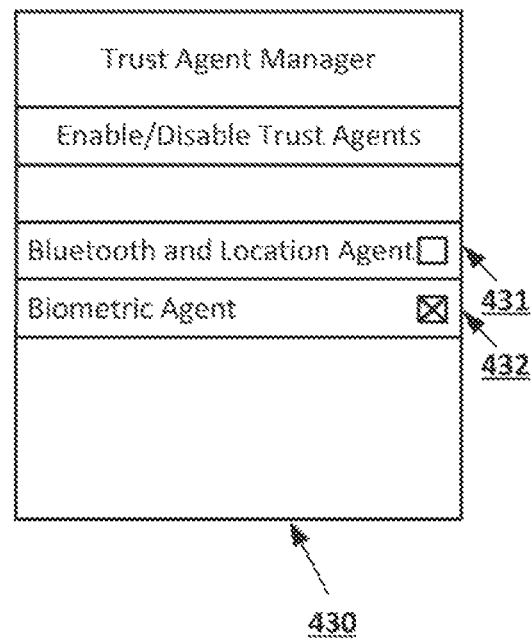
FIGS. 4a and 4b show an example displays for managing trust agents according to an implementation of the disclosed subject matter.
Figure 4B:
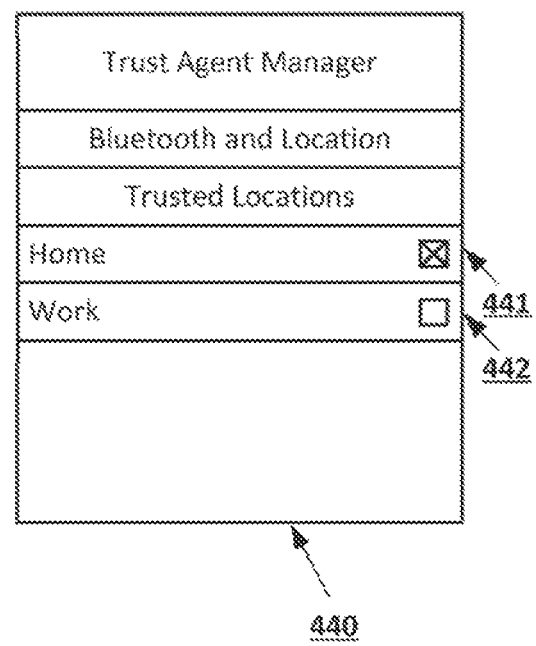

FIGS. 4a and 4b show example displays for managing trust agents according to an implementation of the disclosed subject matter. The trust agent manager 120 may be able to manage the trust agents, such as the trust agents 112 and 114, on the computing device 100. For example, the trust agents 112 and 114 may be enabled and disabled. A trust agent display 430 may display a list of the trust agents installed on the computing device 100. The user may use the trust agent display 430 to enable and disable trust agents, for example, selecting and deselecting the agent enable boxes 431 and 432 to enable and disable the associated trust agents. For example, the agent enable box 432 may be checked, enabling the Biometric Agent, for example, the trust agent 112, while the agent enable box 431 may be unchecked, disabling the Bluetooth and Location Agent, for example, the trust agent 114. Selections made using the trust agent display 430 may be stored in the trust agent settings 145, and the trust agent manager 120 may use the trust agent settings 145 to enable and disable the trust agents, such as the trust agents 112 and 114, as appropriate based on the trust agent settings 145.

A trust agent settings display 440 may be used by a user to manage the operation of individual trust agents. For example, the trust agent settings display 440 may be used to change which locations the Bluetooth (or other short range communications protocol) and Location Agent considers to be trusted, using the check boxes 441 and 442. The user may wish to prevent the Bluetooth and Location Agent from making a trusted state determination based on the detecting that the computing device 100 is located at the user's work address. The user may uncheck the check box 442, and the Bluetooth and Location Agent may no longer make a trusted state determination based on the computing device 100 being located at the user's work address. Any other settings for any trust agents on the computing device 100 may be modified using the trust agent settings display 440. The trust agent settings display 440 may also be accessed from the display of the computing device 100 when the display shows an icon, text, or other representation of the security state of the computing device 100 and the basis for the security state. For example, the computing device 100 may display an icon indicating that the computing device 100 is in a trusted state based on the current location of the computing device 100. The user may select the icon, which may result in the appropriate trust agent settings display 440 for the trust agent that was responsible for the trusted state determination based on location, allowing the user to make changes to the operation of the trust agent. In this way, the user may be able to notice that the computing device 100 has been placed in a trusted state in a situation where the user does not want the computing device 100 to be in a trusted state, and may be able to directly access the proper settings screen to change the trust agent settings 145 to prevent the computing device 100 from being in a trusted state in that particular situation.

Figure 5:
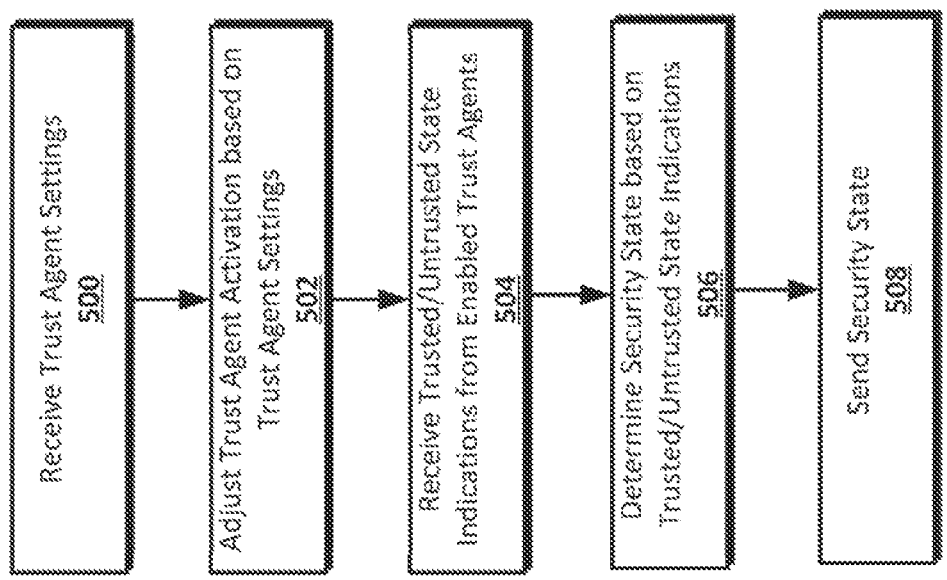
FIG. 5 shows an example of a process for trust agents according to an implementation of the disclosed subject matter.

FIG. 5 shows an example of a process for trust agents according to an implementation of the disclosed subject matter. At 500, trust agent settings may be received. For example, the trust agent manager 120 may be used to edit the trust agent settings 145, enabling or disabling the trust agents 112 and 114 on the computing device 100, or changing the operation of the trust agents 112 and 114. The trust agent settings 145 may be edited by, for example, a user of the computing device 100.

At 502, the activation of trust agents may be adjusted based on the trust agent settings. For example, all trust agents on the computing device 100 may be enabled or disabled in the trust agent settings 145 by default, and the trust agent manager 120 may adjust the default based on changes made to the trust agent settings 145 by, for example, the user. The trust agents 112 and 114 may be enabled or disabled by the trust agent manager 120 based on the trust agent settings 145. The trust agent manager 120 may disable a trust agent, for example, the trust agent 114, when the trust agent settings 145 indicate that the trust agent should be disabled. A disabled trust agent may cease operating, or may not being to operate, on the computing device 100, may not receive signals from the sensors 103, 105, 107, and 109, and may not make trusted/untrusted state determinations.

At 504, trusted/untrusted state indications may be received from trust agents. For example, the trust agent manager 120 may receive an indication of the trusted/untrusted state determination made by any trust agents on the computing device 100 that were not disabled. The trust agents 112 and 114 may, for example, be enabled, and may receive signals from any combination of the sensors 103, 105, 107, and 109, analyze the signals, and make trusted/untrusted state determinations which may be sent to the trust agent manager 120. The trusted/untrusted state determinations may be accompanied by a time component for a trusted state determination and by an indication of the basis for the determination.

At 506, a security state may be determined based on the trusted/untrusted state indications. For example, the trust agent manager 120 may determine whether to place the computing device 100 in a trusted state or untrusted state based on the trusted/untrusted state determinations received from the enabled trust agents, such as the trust agents 112 and 114. The trust agent manager 120 may combine the trusted/untrusted state determinations in any suitable manner, for example, ORing together the determinations with respect to the trusted state, such that only one trusted state determination may be needed to place the computing device 100 in a trusted state. The trust agent manager 120 may cause the computing device 100 to remain in an untrusted state, or exit a trusted state and re-enter an untrusted state, when only untrusted state determinations are received, or when all trusted state determinations expire due to a time component or are revoked due to trust agent changing its trusted/untrusted state determination.

At 508, the security state may be sent. For example, the trust agent manager 120 may send the security state, either trusted or untrusted, to the security manager 130. The security manager 130 may use the security state to govern the operation of the computing device 100, for example, causing security measures to be disabled when the computing device 100 is in a trusted state, and re-enabling the security measures when the computing device 100 exits a trusted state and enters an untrusted state.

Figure 6:
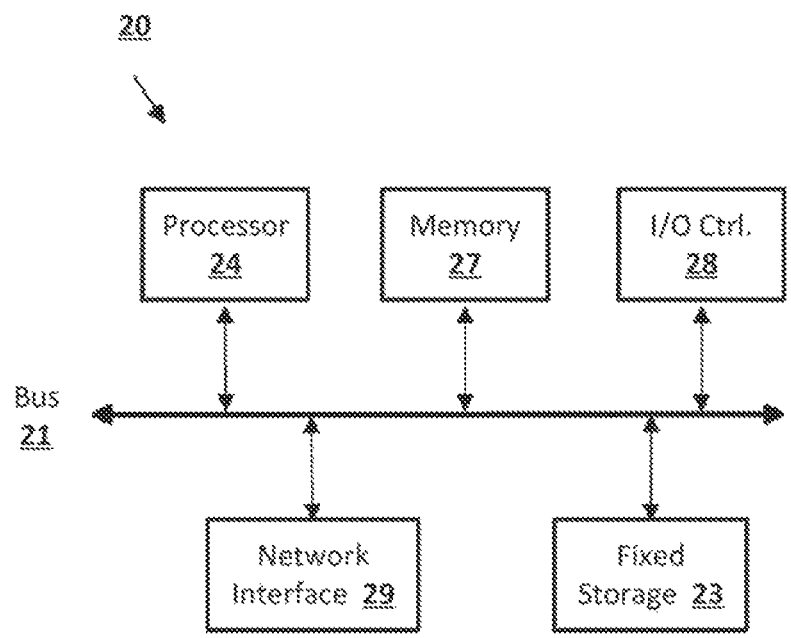
FIG. 6 shows a computer according to an embodiment of the disclosed subject matter.

Embodiments of the presently disclosed subject matter may be implemented in and used with a variety of component and network architectures. FIG. 6 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 7.

Many other devices or components (not shown) may be connected in a similar manner, such as document scanners, digital cameras, auxiliary, supplemental, or backup systems, or the like. Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 7:
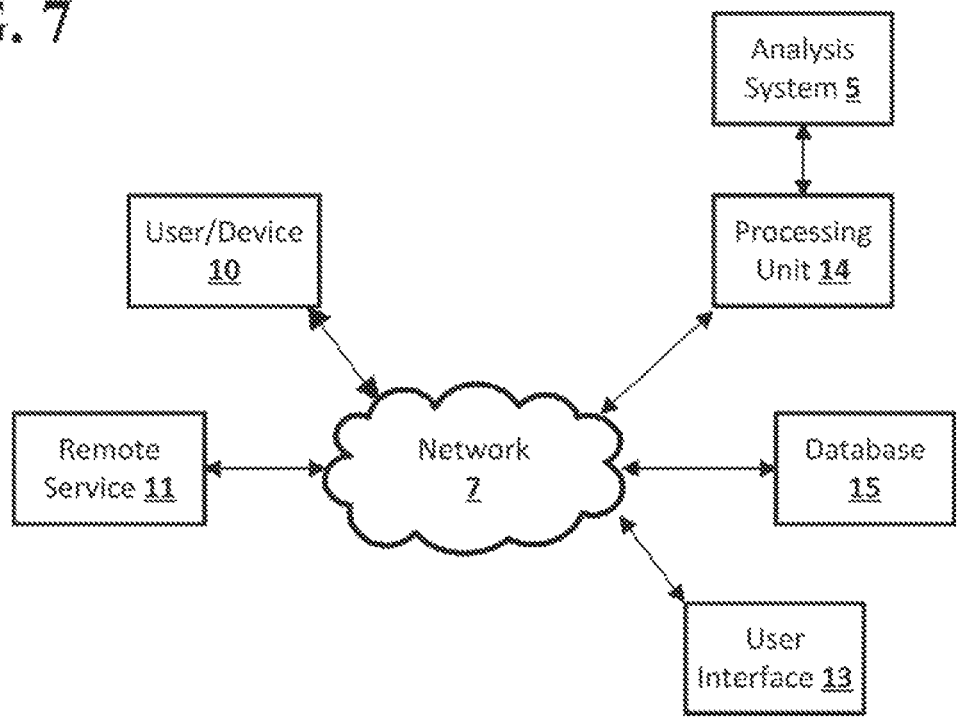
FIG. 7 shows a network configuration according to an embodiment of the disclosed subject matter.

FIG. 7 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments.

However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computing device comprising:
at least one processor;
a memory storing program instructions, which when executed by the at least one processor, cause the at least one processor to:
receive a state determination from each of at least one trust agent, wherein the state determination received from each trust agent indicates either a trusted state or an untrusted state;
based on the received state determination from each trust agent, determine a security state for the computing device; and
when the determined security state for the computing device is the untrusted state, cause the computing device to enter a locked state, wherein the locked state requires user authentication before the computing device is allowed to enter an unlocked state.

2. The computing device of claim 1, wherein the at least one trust agent is implemented in hardware on the computing device.

3. The computing device of claim 1, wherein the at least one trust agent is implemented in a combination of hardware and software on the computing device.

4. The computing device of claim 1, wherein the at least one trust agent is configured to make the state determination based on sensor data from one or more hardware sensors.

5. The computing device of claim 1, wherein the at least one trust agent is configured to make the state determination based on sensor data from a combination of at least one hardware sensor and at least one software sensor.

6. The computing device of claim 1, wherein the program instructions are executable by the at least one processor to cause the computing device to enter the locked state after waking the computing device from a sleep state.

7. The computing device of claim 1, wherein the program instructions are executable by the at least one processor to cause the computing device to enter the locked state after a hardware power button of the computing device is pressed.

8. The computing device of claim 1, wherein the program instructions are executable by the at least one processor to cause the computing device to display a graphical icon indicating that the computing device has entered the locked state.

9. The computing device of claim 8, wherein the graphical icon is depicted as a lock icon.

10. The computing device of claim 1, wherein the computing device comprises a smartphone.

11. The computing device of claim 1, wherein the at least one trust agent is enabled or disabled based on user input, wherein a state determination is not received from a disabled trust agent.

12. The computing device of claim 1, wherein the at least one trust agent comprises a plurality of trust agents, and wherein each of the plurality of trust agents does not communicate a state determination directly to any other trust agent of the plurality of trust agents.

13. The computing device of claim 1, wherein the at least one trust agent comprises a plurality of trust agents each configured to make a state determination based on a different sensor of the computing device.

14. The computing device of claim 1, wherein the at least one trust agent comprises a first trust agent configured to make a state determination based on sensor data from a first sensor and a second sensor, and a second trust agent configured to make a state determination based on sensor data from the second sensor and a third sensor.

15. The computing device of claim 1, wherein the program instructions are executable by the at least one processor to cause the computing device to display an indication of at least one sensor that was the basis for the determined security state.

16. The computing device of claim 1, wherein the program instructions are executable by the at least one processor to determine the security state for the computing device by combining received state determinations from the at least one trust agent by ORing, ANDing or AND NOTing the state determinations.

17. A method comprising:
receiving a state determination from each of at least one trust agent, wherein the state determination received from each trust agent indicates either a trusted state or an untrusted state;
based on the received state determination from each trust agent, determining a security state for a computing device; and
when the determined security state for the computing device is the untrusted state, causing the computing device to enter a locked state, wherein the locked state requires user authentication before the computing device is allowed to enter an unlocked state.

18. The method of claim 17, wherein determining the security state for the computing device based on the at least one trust agent indicating the untrusted state is performed by a trust agent manager, wherein the trust agent manager is a component of an operating system of the computing device.

19. The method of claim 17, further comprising causing the computing device to display the security state determined for the computing device and a reason for the security state determined for the computing device.

20. A non-transitory computer readable medium storing program instructions executable by at least one processor to cause performance of operations comprising:
receiving a state determination from each of at least one trust agent, wherein the state determination received from each trust agent indicates either a trusted state or an untrusted state;
based on the received state determination from each trust agent, determining a security state for a computing device; and
when the determined security state for the computing device is the untrusted state, causing the computing device to enter a locked state, wherein the locked state requires user authentication before the computing device is allowed to enter an unlocked state.

* * * * *